(12) United States Patent
Adiga et al.

(10) Patent No.: US 12,505,365 B2
(45) Date of Patent: Dec. 23, 2025

(54) ANTI-FUSE AND FUSE STRUCTURES FOR IMPROVING THE FUNCTIONALITY OF QUBIT CIRCUITS

(71) Applicant: INTERNATIONAL BUSINESS MACHINES CORPORATION, Armonk, NY (US)

(72) Inventors: Vivekananda P. Adiga, Ossining, NY (US); Russell A. Budd, North Salem, NY (US); Charles Thomas Rettner, San Jose, CA (US); Stephen M. Gates, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 915 days.

(21) Appl. No.: 17/722,301

(22) Filed: Apr. 15, 2022

(65) Prior Publication Data
US 2023/0334354 A1   Oct. 19, 2023

(51) Int. Cl.
*G06N 10/00* (2022.01)
*B82Y 10/00* (2011.01)
(Continued)

(52) U.S. Cl.
CPC ......... *G06N 10/00* (2019.01); *H01L 23/5252* (2013.01); *H01L 23/5256* (2013.01); *H10N 60/80* (2023.02); *B82Y 10/00* (2013.01)

(58) Field of Classification Search
CPC .... G06N 10/00; H10N 60/80; H01L 23/5252; H01L 23/5256; B82Y 10/00
See application file for complete search history.

(56) References Cited

U.S. PATENT DOCUMENTS

| | | | |
|---|---|---|---|
| 5,623,160 A | * | 4/1997 | Liberkowski ....... H01L 23/5383 257/50 |
| 5,920,789 A | | 7/1999 | Bernstein |

(Continued)

FOREIGN PATENT DOCUMENTS

| | | |
|---|---|---|
| EP | 1 450 406 A1 | 8/2004 |
| WO | 2022136493 A1 | 6/2022 |

OTHER PUBLICATIONS

United States Notice of Allowance dated Oct. 8, 2024, 9 pages, in U.S. Appl. No. 17/936,845.
(Continued)

*Primary Examiner* — Dale E Page
(74) *Attorney, Agent, or Firm* — Amin, Turocy & Watson, LLP

(57) ABSTRACT

A superconducting connecting system includes an anti-fuse structure. There is a first superconducting trace having a first segment that is cantilevered over a cavity a substrate. A second superconducting trace having a second segment is cantilevered over the cavity in the substrate. A first auxiliary segment is coupled to the first segment and suspended over the cavity. A second auxiliary segment is coupled to the second segment and suspended over the cavity. The first segment and the second segment face each other and have a predetermined gap therebetween. The first segment and the second segment are configured to receive an output of a laser. An amount of material of the first and second auxiliary segment is based on creating a fuse ball joint that provides an electrical short between the first superconducting trace and the second superconducting trace, upon receiving the output of the laser.

24 Claims, 13 Drawing Sheets

(51) Int. Cl.
*H01L 23/525* (2006.01)
*H10N 60/80* (2023.01)

(56) References Cited

U.S. PATENT DOCUMENTS

| | | | | |
|---|---|---|---|---|
| 5,936,297 | A * | 8/1999 | Jun | ............. H01L 23/5254 |
| | | | | 257/50 |
| 6,288,437 | B1 * | 9/2001 | Forbes | ............. H01L 23/5252 |
| | | | | 257/529 |
| 6,378,079 | B1 | 4/2002 | Mullarkey | |
| 7,129,567 | B2 * | 10/2006 | Kirby | ............. H01L 21/76898 |
| | | | | 257/E23.079 |
| 9,628,086 | B2 | 4/2017 | He et al. | |
| 9,935,252 | B2 | 4/2018 | Abraham et al. | |
| 10,170,681 | B1 | 1/2019 | Rosenblatt et al. | |
| 10,340,438 | B2 | 7/2019 | Rosenblatt et al. | |
| 10,431,866 | B2 | 10/2019 | Adiga et al. | |
| 10,833,239 | B2 | 11/2020 | Brink et al. | |
| 2002/0011645 | A1 | 1/2002 | Bertin | |
| 2005/0051868 | A1 | 3/2005 | Motsiff | |
| 2008/0218305 | A1 * | 9/2008 | Bender | ............. H01H 85/046 |
| | | | | 29/623 |
| 2017/0133576 | A1 | 5/2017 | Marcus et al. | |
| 2019/0165244 | A1 | 5/2019 | Hertzberg et al. | |
| 2019/0363418 | A1 | 11/2019 | Adiga et al. | |
| 2021/0217947 | A1 | 7/2021 | Adiga et al. | |
| 2022/0293845 | A1 | 9/2022 | Phung | |

OTHER PUBLICATIONS

International Search Report and Written Opinion issued Jul. 20, 2023 in related application No. PCT/EP2023/059581, 15 pgs.

* cited by examiner

ANTI-FUSE AND FUSE STRUCTURES FOR IMPROVING THE FUNCTIONALITY OF QUBIT CIRCUITS

BACKGROUND

Technical Field

The present disclosure generally relates to quantum circuits, and more particularly, to superconducting connectors that can be used to program quantum circuits.

Description of the Related Art

Superconducting quantum computing is an implementation of a quantum computer in superconducting electronic circuits. Quantum computation studies the application of quantum phenomena for information processing and communication. Various models of quantum computation exist, and the most popular models include the concepts of qubits and quantum gates. A qubit is a generalization of a bit that has two possible states, but can be in a quantum superposition of both states. A quantum gate is a generalization of a logic gate, however the quantum gate describes the transformation that one or more qubits will experience after the gate is applied on them, given their initial state. Various quantum phenomena, such as superposition and entanglement, do not have analogs in the world of classical computing and therefore may involve special structures, techniques, and materials. Further, qubit technology is still at its infancy and developing components, such as a qubit having a predetermined frequency with high precision, is a challenge. For example, qubit frequencies can be tuned using coils or by modifying junction resistances using laser or changing the capacitances by either etching into substrate. Each one of these approaches poses its own challenge.

SUMMARY

A superconducting connecting system includes an anti-fuse structure that includes a first superconducting trace having a first segment that is cantilevered over a cavity a substrate. A second superconducting trace having a second segment is cantilevered over the cavity in the substrate. A first auxiliary segment is coupled to the first segment and suspended over the cavity. A second auxiliary segment is coupled to the second segment and suspended over the cavity. The first segment and the second segment face each other and have a predetermined gap therebetween. The first segment and the second segment are configured to receive an output of a laser. The materials and geometry of first segment and the second segment and of the gap therebetween are such that a fused ball joint is formed that provided an electrical short between the first segment and the second segment An amount of material of the first and second auxiliary segments is based on creating an improved fuse ball joint that provides an electrical short between the first superconducting trace and the second superconducting trace, upon receiving the output of the laser.

In one embodiment, the first and second auxiliary segments are on a same metal plane and of a same superconducting material as the first and second superconducting traces.

In one embodiment, the first and second auxiliary segments are on a same plane as the first and second superconducting traces, but are constructed of different material to lower a melting temperature in creating the fuse ball joint. By lowering the melting temperature, a ball joint that provides an electrical short is more easily produced.

In one embodiment, a shape of the auxiliary first and second segments is wing shaped.

In one embodiment, the auxiliary first and second segments have a melting temperature that is lower than a melting temperature of the first and second superconducting traces.

In one embodiment, there is a triangular shaped silicon support under each of the first segment and the second segment. These supports provide additional structural support to prevent sagging of the first and second segments.

In one embodiment, the amount of material of the first and second auxiliary segments is based on creating at least two fuse ball joints that each provide an electrical short between the first superconducting trace and the second superconducting trace, upon receiving the output of the laser. By virtue of providing a redundant number of fuse ball joints, conductivity is improved and the probability of a short between the first conducting trace and the second superconducting trace is improved.

In one embodiment, there is a fuse structure that includes a third superconducting trace having a first node and a second node. The third superconducting trace has a portion suspended over a second cavity in the substrate. The first, second, and third superconducting traces are of a same material and on a same metal plane. The third superconducting trace is configured to receive an output of the laser at the suspended portion to provide an electrical open between the first node and the second node, upon receiving the output of the laser.

In one embodiment, the first superconducting trace and the second superconducting trace have a first crystal direction. The third superconducting trace can have a second crystal direction. For example, the first crystal direction can have a 110 direction and the second crystal direction can have a 100 direction.

According to one embodiment, a connecting system, has a fuse structure that includes a substrate having a cavity. A first superconducting trace has a first node and a second node and a portion suspended over the cavity. The third superconducting trace is configured to receive an output of the laser at the suspended portion to provide an electrical open between the first node and the second node, upon receiving the output of the laser.

In one embodiment, the connecting system also includes an anti-fuse structure that includes a second superconducting trace having a first segment that is cantilevered over a second cavity in the substrate. There is a third superconducting trace having a second segment that is cantilevered over the second cavity in the substrate. A first auxiliary segment is coupled to the first segment and suspended over the second cavity. A second auxiliary segment is coupled to the second segment and suspended over the second cavity. The first segment and the second segment face each other and have a predetermined gap therebetween. The first segment and the second segment are configured to receive an output of the laser. An amount of material of the first and second auxiliary segment is based on creating a fuse ball joint that provides an electrical short between the second superconducting trace and the third superconducting trace, upon receiving the output of the laser.

In one embodiment, the first and second auxiliary segments are on a same metal plane and of a same superconducting material as the second and third superconducting traces.

In one embodiment, the first and second auxiliary segments are on a same plane as the first and second superconducting traces, but are constructed of different material to lower a melting temperature in creating the fuse ball joint.

In one embodiment, the second superconducting trace and the third superconducting trace have a first crystal direction. The first superconducting trace has a second crystal direction. The first, second, and third superconducting traces are on a same metal plane.

According to one embodiment, a superconducting connecting system has an anti-fuse structure that includes a substrate. There is a first superconducting trace having a first segment that is cantilevered over a cavity in the substrate. A second superconducting trace having a second segment is cantilevered over the cavity in the substrate. The first segment and the second segment face each other, are parallel to each other, and have a predetermined gap therebetween. The first segment and the second parallel segments are configured to receive an output of a laser. An amount of the first and second material of the parallel segments is based on creating a plurality of fuse ball joints that each provide an electrical short between the first superconducting trace and the second superconducting trace, upon receiving the output of the laser.

In one embodiment, there is a fuse structure comprising a third superconducting trace having a first node and a second node. The third superconducting trace has a portion suspended over a second cavity in the substrate. The first, second, and third superconducting traces are of a same material and on a same metal plane (e.g., as the rest of the circuitry). The third superconducting trace is configured to receive an output of the laser at the suspended portion to provide an electrical open between the first node and the second node, upon receiving the output of the laser.

In one embodiment, the first superconducting trace and the second superconducting trace have a first crystal direction. The third superconducting trace has a second crystal direction.

According to one embodiment, a method of programming superconducting components includes providing a first superconducting trace having a first segment that is cantilevered over a cavity in a substrate. A second superconducting trace having a second segment that is cantilevered over the cavity in the substrate is provided. A first auxiliary segment is coupled to the first segment and the first auxiliary segment is suspended over the cavity. A second auxiliary segment is coupled to the second segment and suspended over the cavity. The first segment and the second segment face each other and have a predetermined gap therebetween. A laser is applied to the first segment and the second segment to create a fuse ball joint based on the auxiliary segment, which provides an electrical short between the first superconducting trace and the second superconducting trace.

In one embodiment, the first and second auxiliary segments are on a same plane as the first and second superconducting traces, but are constructed of different material to lower a melting temperature in creating the fuse ball joint.

In one embodiment, a third superconducting trace having a first node and a second node is provided. The third superconducting trace has a portion suspended over a second cavity in the substrate. The first, second, and third superconducting traces are of a same material and on a same metal plane. The laser is applied to the third superconducting trace at the suspended portion to provide an electrical open between the first node and the second node.

In one embodiment, the first superconducting trace and the second superconducting trace have a first crystal direction and the third superconducting trace has a second crystal direction.

In one embodiment, the substrate comprises silicon (Si). The cavity in the substrate is created by an etching of the substrate with at least one of tetramethyl ammonium hydroxide (TMAH), potassium hydroxide (KOH), or tetraethyl ammonium hydroxide (TEAH).

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1:
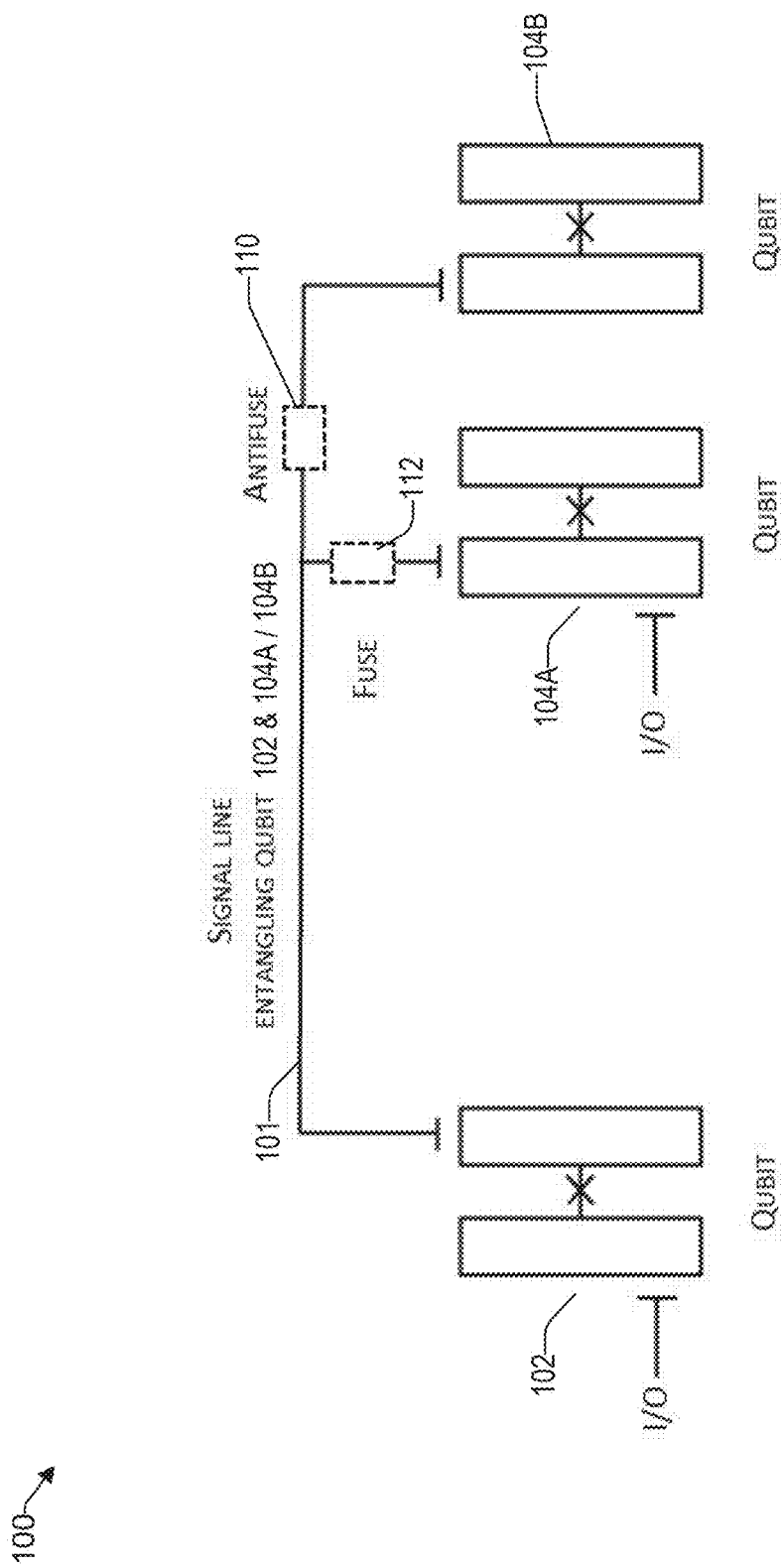
FIG. 1 is an example superconducting switch system, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

In one aspect, spatially related terminology such as "front," "back," "top," "bottom," "beneath," "below," "lower," above," "upper," "side," "left," "right," and the like, is used with reference to the direction of the Figures being described. Since components of embodiments of the disclosure can be positioned in a number of different directions, the directional terminology is used for purposes of illustration and is in no way limiting. Thus, it will be understood that the spatially relative terminology is intended to encompass different directions of the device in use or operation in addition to the direction depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other directions) and the spatially relative descriptors used herein should be interpreted accordingly.

As used herein, the terms "lateral" and "horizontal" describe an orientation parallel to a first surface of a chip.

As used herein, the term "vertical" describes an orientation that is arranged perpendicular to the first surface of a chip, chip carrier, or semiconductor body.

As used herein, the terms "coupled" and/or "electrically coupled" are not meant to mean that the elements must be directly coupled together—intervening elements may be provided between the "coupled" or "electrically coupled" elements. In contrast, if an element is referred to as being "directly connected" or "directly coupled" to another element, there are no intervening elements present. The term "electrically connected" refers to a low-ohmic electric connection between the elements electrically connected together.

Although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

Example embodiments are described herein with reference to cross-sectional illustrations that are schematic illustrations of idealized or simplified embodiments (and intermediate structures). As such, variations from the shapes of the illustrations as a result, for example, of manufacturing techniques and/or tolerances, may be expected. Thus, the regions illustrated in the figures are schematic in nature and their shapes do not necessarily illustrate the actual shape of a region of a device and do not limit the scope. It should be appreciated that the figures and/or drawings accompanying this disclosure are exemplary, non-limiting, and not necessarily drawn to scale.

It is to be understood that other embodiments may be used and structural or logical changes may be made without departing from the spirit and scope defined by the claims. The description of the embodiments is not limiting. In particular, elements of the embodiments described hereinafter may be combined with elements of different embodiments.

As used herein, certain terms are used indicating what may be considered an idealized behavior, such as, for example, "lossless," "superconductor," or "superconducting," which are intended to cover functionality that may not be exactly ideal but is within acceptable margins for a given application. For example, a certain level of loss or tolerance may be acceptable such that the resulting materials and structures may still be referred to by these "idealized" terms.

The concepts herein can relate to superconducting circuits, such as those used in quantum technology and quantum chips. Regarding quantum technology, the electromagnetic energy associated with a qubit can be stored, for example, in so-called Josephson junctions and in the capacitive and inductive elements that are used to form the qubit. In other examples, there may be spin qubits coupled to resonators or topological qubits, microfabricated ion traps, etc. Other types of superconducting components are supported by the teachings herein as well, including (without limitation), circulators, isolators, amplifiers, filters, active control electronics such as rapid single flux quantum (RSFQ), etc., that can be programmed (e.g., finetuned by way of turning ON and OFF switch devices, sometimes referred to herein as fuses or anti-fuses). Accordingly, various components described herein can be programmed and/or reprogrammed by such fuses and/or anti-fuses. As used herein, a "superconducting fuse device" (sometimes also referred to herein as a "fuse") can comprise a type of superconducting switch device that can provide an electrical connection that can be opened (e.g., to interrupt the flow of electrical current between two electrodes). A "superconducting anti-fuse device" (sometimes also referred to herein simply as an "anti-fuse") can comprise another type of superconducting switch device that can be closed to provide an electrical connection (e.g., to enable electrical current to flow between two electrodes). Fuses and anti-fuses are collectively referred to herein as superconducting switch devices.

A qubit system may include one or more readout resonators coupled to the qubit. A readout resonator may be a transmission line that includes a capacitive connection to ground on one side and is either shorted to the ground on the other side, such as for a quarter wavelength resonator, or may have a capacitive connection to ground, such as for a half wavelength resonator, which results in oscillations within the transmission line, with the resonant frequency of the oscillations being close to the frequency of the qubit. For example, the readout resonator affects a pulse coming from the control/measurement instruments at the readout resonator frequency. The pulse acts as a measurement that decoheres the qubit and makes it collapse into a state of "one" or "zero," thereby imparting a phase shift on that measurement pulse.

Between qubits there may be a coupling resonator, which allows coupling different qubits together in order to realize quantum logic gates. The coupling resonator is typically structurally similar to the readout resonator in that it is a transmission line that includes capacitive connections to ground on both sides, which also results in oscillations within the coupling resonator. When a qubit is implemented as a transmon, each side of the coupling resonator is coupled (e.g., capacitively or inductively) to a corresponding qubit by being in adequate proximity to (e.g., the capacitor of) the qubit. Since each side of the coupling resonator has coupling with a respective different qubit, the two qubits are coupled together through the coupling resonator. In this way, there is mutual interdependence in the state between coupled qubits, thereby allowing a coupling resonator to use the state of one qubit to control the state of another qubit. Entanglement occurs when the interaction between two qubits is such that the states of the two cannot be specified independently, but can only be specified for the whole system. In this way, the states of two qubits are linked together such that a measurement of one of the qubits, causes the state of the other qubit to alter. The structures discussed herein can provide redundancy to quantum circuit, where qubits that are to be part of processor and those that are not can be selected.

In one aspect, the teachings herein relate to superconducting switch devices that provide a technical improvement (e.g., benefit) of a programmable and/or a reprogrammable quantum circuit, where based on one or more criteria, of a quantum circuit such as coherence, fidelity, frequency collisions/crowding, efficiency, lattice geometries that enable quantum error correction (i.e., with surface codes) and/or another performance criterion, the connectivity (e.g., coupling) of one or more quantum computing elements can be configured and/or reconfigured. For example, a use could be to disconnect (e.g., fuse) certain malfunctioning (e.g., having poor coherence, fidelity, etc.) portions of the circuits and connecting (e.g., anti-fuse) better performing portions of the circuit to enable efficient operation of a quantum processor. Accordingly, by virtue of the teachings herein, a quantum processor can provide a programmable and/or reprogrammable quantum circuit that can be modified to improve one or more performance criteria of such a quantum circuit and/or provide redundancy (e.g., replacement of malfunctioning components). Such one or more embodiments of the subject disclosure can thereby improve one or more performance criteria (e.g., accuracy, fidelity, and/or another performance criterion) of such a quantum processor comprising one or more of the various embodiments of the subject disclosure.

In one aspect, the teachings herein use a substrate as a sacrificial material by undercutting it with a suitable technique, such as wet etching or ion milling, thereby reducing fabrication steps. The directionality of this etch provides the technical benefit of using a same process to provide superconducting fuse and anti-fuse structures with a same fabrication step such as Ethylenediamine pyrocatechol (EDP), Hydrazine, Potassium Hydroxide (KOH), all quaternary hydroxides like tetramethyl ammonium hydroxide (TMAH), tetraethyl ammonium hydroxide (TEAH) etc. These act as oxidants. Note that, these individual solutions can be mixture of different additives, such as isopropyl alcohol, pyrocatechol which act as complexing agents, and sometimes surfactants that control the etch characteristics of different silicon planes are added to the mixture. These superconducting switch devices provide bidirectional and/or incremental frequency tuning capability by adding and/or removing circuit elements, such as capacitors and/or inductors in the quantum circuits, as well as providing redundancy, thereby enhancing the reliability of a quantum system. The superconducting switch devices simplify the fabrication process while not adversely impacting qubit coherence. The techniques described herein may be implemented in a number of ways. Example implementations are provided below with reference to the following figures.

Example Superconducting Switch System

Reference now is made to FIG. 1, which is an example superconducting switch system 100, consistent with an illustrative embodiment. In the example of FIG. 1, one or more superconducting switch devices, represented by anti-fuse 110 and fuse 112 can be used to alter the entangling state (e.g., connected and disconnected) between quantum computing elements, represented by qubits 102, 104A, and 104B using the signal line 101. By way of example, consider a fabrication defect rendering qubit 104A defective. The signal line 101 can be reprogrammed to alter the entangling between qubit 102 and qubits 104A and 104B. For example, the signal line 101 can be severed between qubit 102 and qubit 104 by programming (e.g., blowing) fuse 112. The signal line 101 can be connected to qubit 104B instead by programming (e.g., shorting) anti-fuse 110, thereby entangling qubit 102 with previously redundant qubit 104B. In this way, an example programmable quantum circuit is provided. In one embodiment, the anti-fuse 110 and the fuse 112 are fabricated on a common layer, which substantially reduces complexity and manufacturing cost. The fabrication of the subject fuses and anti-fuses is discussed in more detail later.

Example Fuse and Anti-Fuse Structures and Fabrication Thereof

Figure 2:
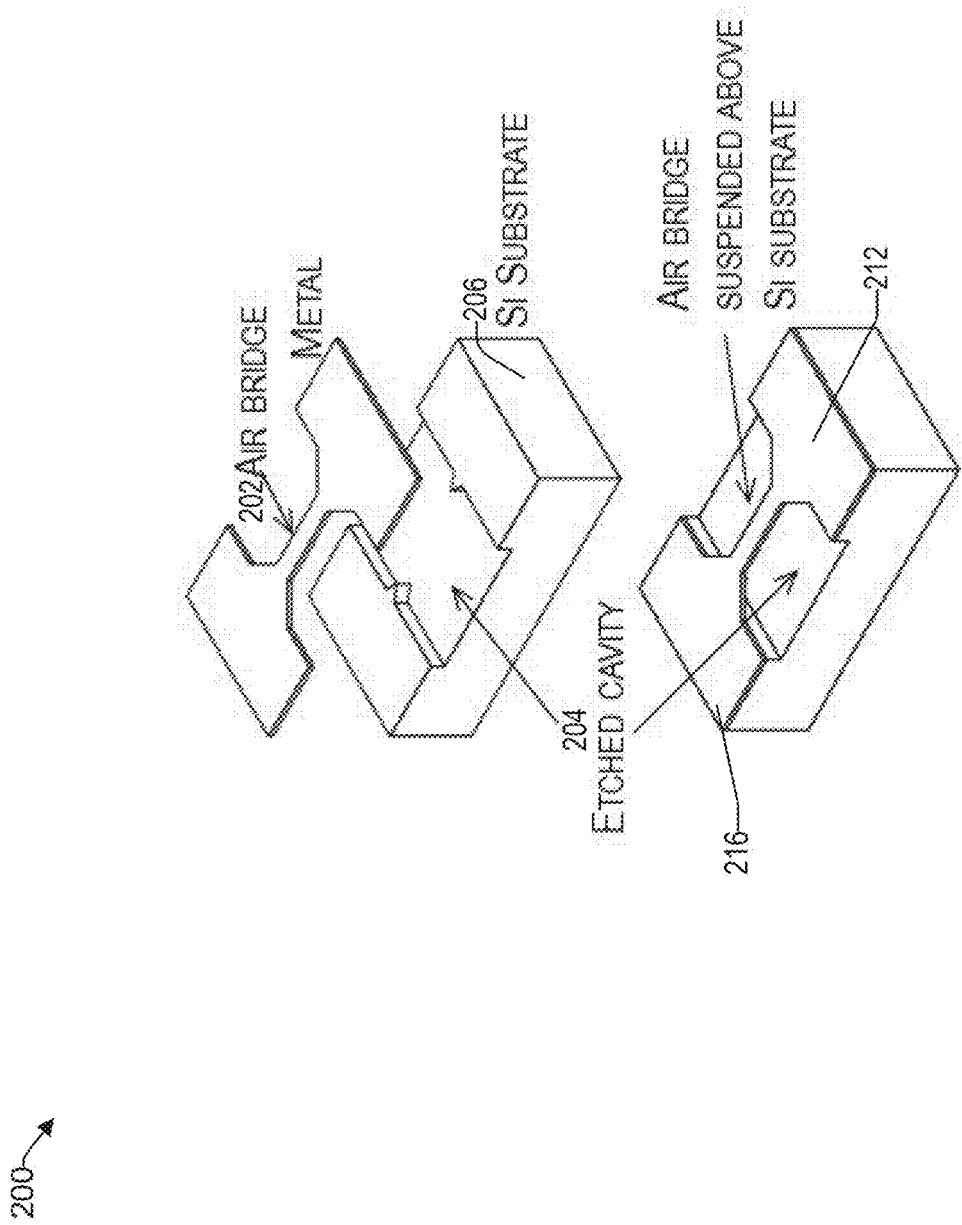
FIG. 2 is a perspective view and partial exploded view of an example superconducting fuse structure, consistent with an illustrative embodiment.

FIG. 2 is a perspective view and partial exploded view of an example superconducting fuse structure 200, consistent with an illustrative embodiment. Superconducting fuse structure 200 can be used, for example, to alter the coupling of a first quantum computing element and as second quantum computing element that is coupled to its electrodes.

The fabrication of the superconducting fuse structure 200 can comprise multi-step sequences of, for example, photolithographic and/or chemical processing steps that facilitate creation of electronic-based systems, devices, components, and/or circuits in a semiconducting and/or a superconducting device (e.g., an integrated circuit). For instance, superconducting anti-fuse structure 200 can be fabricated on one or more substrates 206. In various embodiments, the substrate 206, may comprise any suitable material or combination of materials, such as doped or undoped silicon, glass, dielectrics, etc. For example, the substrate may comprise a semiconductor-on-insulator (SOI) structure, e.g., with a buried insulator layer, or a bulk material substrate, e.g., with appropriately doped regions, typically referred to as wells. In another embodiment, the substrate may be silicon with silicon oxide, nitride, or any other insulating films on top. In another embodiment, the substrate 206 comprises intrinsic (i.e., undoped) silicon (Si). Other materials that may be used for the substrate include, without limitation, sapphire, aluminum oxide, germanium, gallium arsenide (GaAs) or any of the other III-V periodic table compounds, indium phosphide (InP), silicon carbide (SiC), a superconducting alloy of silicon and germanium, quartz, etc. Thus, as used herein, the term substrate 206 refers to a foundation upon which various superconducting structures can be built.

The superconducting fuse structure 200 can be fabricated by using various techniques including, but not limited to: photolithography, microlithography, nanolithography, nanoimprint lithography, photomasking techniques, patterning techniques, photoresist techniques (e.g., positive-tone photoresist, negative-tone photoresist, hybrid-tone photoresist, and/or another photoresist technique), etching techniques (e.g., reactive ion etching (RIE), dry etching, wet etching, ion beam etching, plasma etching, laser ablation, and/or another etching technique), evaporation techniques, sputtering techniques, plasma ashing techniques, thermal treatments (e.g., rapid thermal anneal, furnace anneals, thermal oxidation, and/or another thermal treatment), chemical vapor deposition (CVD), atomic layer deposition (ALD), physical vapor deposition (PVD), molecular beam epitaxy (MBE), electrochemical deposition (ECD), chemical-mechanical planarization (CMP), back-grinding techniques, and/or another technique for fabricating an integrated circuit.

As shown in FIG. 2, the superconducting fuse structure 200 includes a trace having a first node 212 and a second node 216 having a portion suspended above the substrate 206 forming an airbridge, sometimes referred to herein simply as a bridge. In various embodiments, the bridge 202 may be a stressed film or stress free, which is suspended over an etched cavity 204. In one embodiment, the etched cavity 204 can be created by providing a sacrificial layer (not shown) that is formed and/or deposited via any suitable patterning and/or lithographic technique (e.g., oxidation, angled evaporation, etc.) on the substrate 206. In various embodiments, the sacrificial layer may be an oxide layer and/or any other suitable sacrificial material used in micro and/or nano fabrication. The sacrificial material can be undercut by, for example and without limitation, Ethylenediamine pyrocatechol (EDP), Hydrazine, Potassium Hydroxide (KOH), all quaternary hydroxides like tetramethyl ammonium hydroxide (TMAH), tetraethyl ammonium hydroxide (TEAH) etc. These act as oxidants. Note that, these individual solutions can be mixture of different additives, such as isopropyl alcohol, pyro-catechol which act as complexing agents, and sometimes surfactants that control the etch characteristics of different silicon planes are added to the mixture. In one embodiment, the clearance that results in the etched cavity is based on the etch depth. It has been determined that an etch on a 110 crystal direction terminates at 111, which limit the undercut. However, an etch on the 110 crystal direction is faster (>1.8×) than etch on 100 crystal direction (which terminates in extremely slow etching 111 plane). This enables to have deep undercut (e.g., fully suspended fuses) and shallow undercut (e.g., anti-fuse) structures based on their crystal orientation.

In various embodiments, the superconducting material of the bridge may comprise niobium, aluminum, and/or any other suitable superconducting material, which can be deposited via any suitable patterning and/or lithographic technique over and/or across the sacrificial layer (not shown). Accordingly, as shown illustrated in FIG. 2, some portions (e.g., 212 and 216) of the superconducting bridge 202 are formed on the substrate 206 while another portion of the superconducting bridge 202 is formed on top of the sacrificial layer. Stated differently, the sacrificial layer is between the superconducting bridge 202 and the substrate 206. As mentioned above, the sacrificial layer can be removed via any suitable technique (e.g., wet etching, ion milling) using, for example, TMAH, KOH, and/or TEAH, thereby leaving an etched cavity 204 where the sacrificial layer previously was located.

Figure 3:
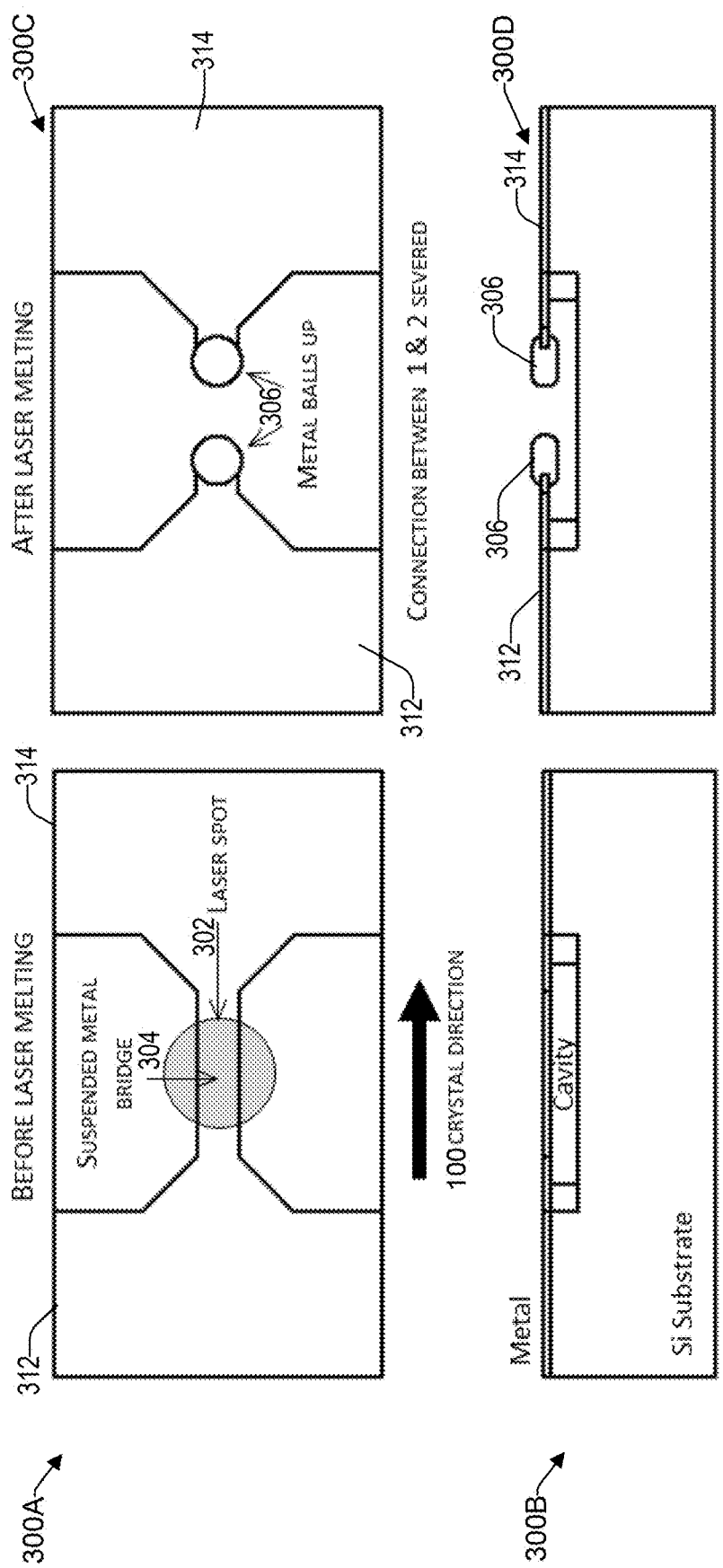
FIG. 3 provides top views and cross section views of a superconducting fuse structure before and after laser melting, respectively, consistent with an illustrative embodiment.

Reference now is made to FIG. 3, which provides top views 300A and 300C and cross section views 300B and 300D of a superconducting fuse structure before and after laser melting, respectively, consistent with an illustrative embodiment. The suspended metal bridge 304 has a spot 302 that is configured to receive a laser output (e.g., be exposed to a laser) to alter its state (e.g., open or electrical short). As illustrated in views 300C and 300D of FIG. 3, upon receiving the laser output (e.g., laser melting), the bridge melts and creates metal balls 306, thereby severing a connection between nodes 312 and 314. In one embodiment, the superconducting fuse is along 100 crystal direction of the silicon substrate.

As mentioned previously, the teachings herein also provide anti-fuses that can be on the same superconducting metal plane as that of the fuse. In this regard, reference is made to FIG. 4, which provides a perspective view and partial exploded view of an example superconducting anti-fuse structure 400, consistent with an illustrative embodiment. Superconducting anti-fuse structure 400 can be used, for example, to alter the coupling of a first quantum computing element and a second quantum computing element that is coupled to its electrodes. To improve manufacturing efficiency and save cost, the processing of the anti-fuse structure is substantially similar to that of the superconducting fuse structure 200 discussed in the context of FIG. 2, and therefore not repeated here for brevity. The salient differences are discussed below.

Figure 4:
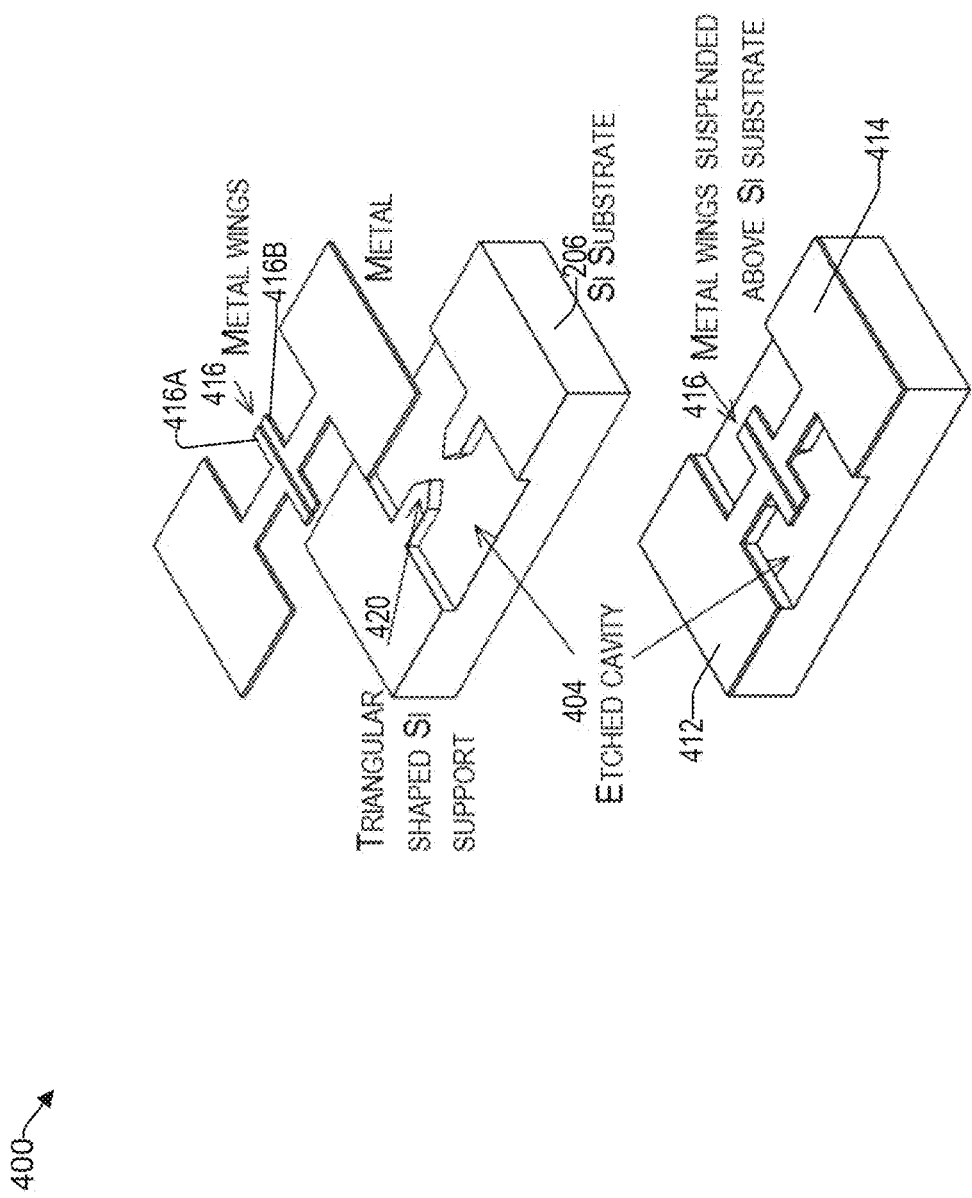
FIG. 4 provides a perspective view and partial exploded view of an example superconducting anti-fuse structure, consistent with an illustrative embodiment.

As shown in FIG. 4, the superconducting fuse structure 400 includes a first superconducting trace 412 having a first segment (e.g., lead surface) and a second superconducting trace 414 having a second segment (e.g., lead surface). Both the first and second segments are cantilevered over the substrate 206. An undercutting (e.g., 0.2-10 μm) of corners (e.g., 100 direction) compared to first or second segments can give rise to full undercut of side extensions. In one embodiment, a deep etch (0.2-5 μm) results in a triangular shaped silicon support 420 underneath the first and second lead surfaces. In this way, the cantilevered (e.g., suspended) portions that are in the etched cavity 404 are provided structural support (e.g., to prevent metal balls moving away from each other as opposed to merging and forming a single molten ball).

There can be a first auxiliary suspended material (e.g., superconducting metal) 416A having a top portion and a bottom portion, coupled to the suspended portion of the first superconducting trace 412 and a second auxiliary suspended material (e.g., superconducting metal) 416B coupled to the suspended portion of the second superconducting trace 414. In one embodiment, the shape of the first and second auxiliary suspended material can be wing shaped 416. Additional example geometries for the auxiliary segments are discussed later. The auxiliary suspended material may comprise the same material and be created during a same processing step as that of the first and second superconducting traces 412 and 414.

The first segment and second segment face each other and have a predetermined gap therebetween. In one embodiment, an amount of the first and second auxiliary material 416A and 416B is based on creating fuse ball joint upon receiving the laser pulse, discussed in more detail below.

Figure 5:
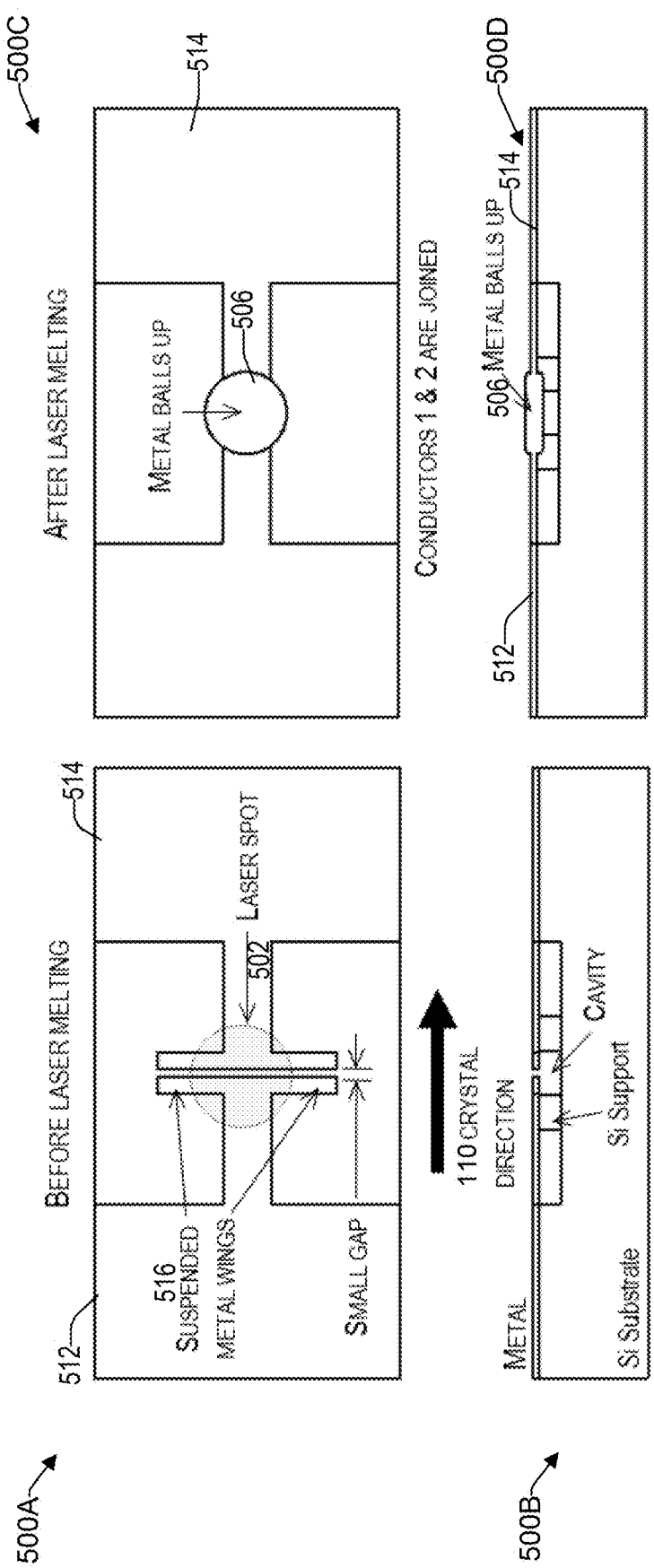
FIG. 5 provides top views and cross section views of a superconducting anti-fuse structure before and after laser melting, respectively, consistent with an illustrative embodiment.

FIG. 5 provides a top views 500A and 500C and cross section views 500B and 500D of a superconducting anti-fuse structure before and after laser melting, respectively, consistent with an illustrative embodiment. The cantilevered portion of the first superconducting trace 512 and the cantilevered portion of the second superconducting trace 512, together with the first and second auxiliary suspended material 516 (e.g., suspended metal wings) are configured to receive a laser output (e.g., be exposed to a laser) to alter its state (e.g., open to closed). As illustrated in views 500C and 500D of FIG. 5, upon receiving the laser output (e.g., laser melting), the structure melts and creates a metal ball 506 based on the material of the first and second auxiliary suspended material 516, thereby creating a connection (e.g., short) between superconducting traces 512 and 514. For example, there is maximum heat dissipation at the center of the output of the laser beam 502, melting the side arms of the suspended metal wings 516 and forming a molten ball 506 in the center. In one embodiment, the first superconducting trace and the second superconducting trace have a crystal direction (i.e., 110 crystal direction) that is different from that of the fuse.

Figure 6:
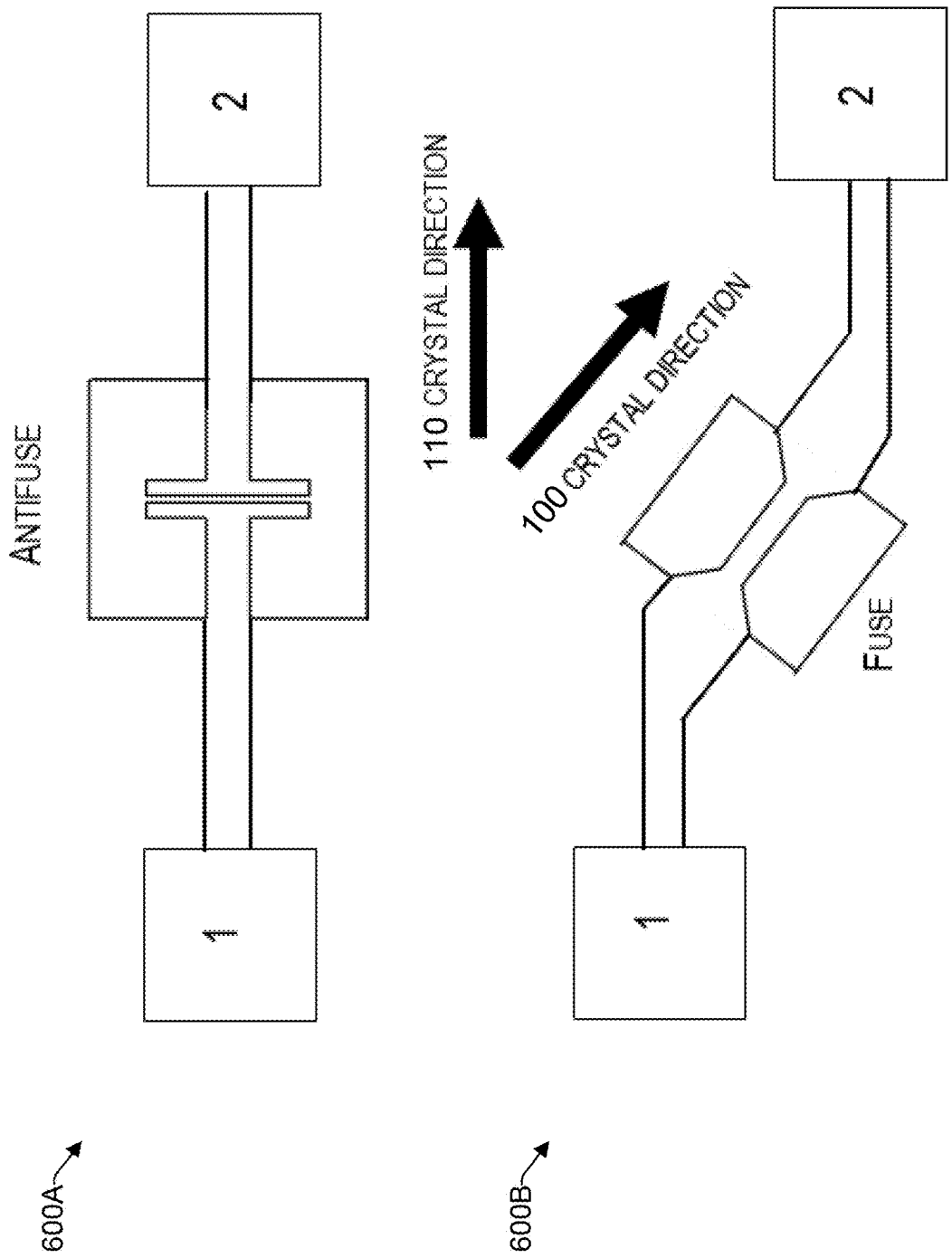
FIG. 6 provides an anti-fuse having a first crystal direction and a fuse having a second crystal direction, consistent with an illustrative embodiment.

The concept of crystal directions may be better understood in view of FIG. 6, which provides an anti-fuse 600A having a first crystal direction and a fuse 600B in a second crystal direction, consistent with an illustrative embodiment. For example, both anti-fuses (e.g., 600A) and fuses (e.g., 600B) can be fabricated at the same time and having a common superconducting metal layer for the programming occurs. Anti-fuses can be aligned along the 110 crystal direction of silicon substrate, whereas fuses can be aligned along the 100 crystal direction.

Figure 7:
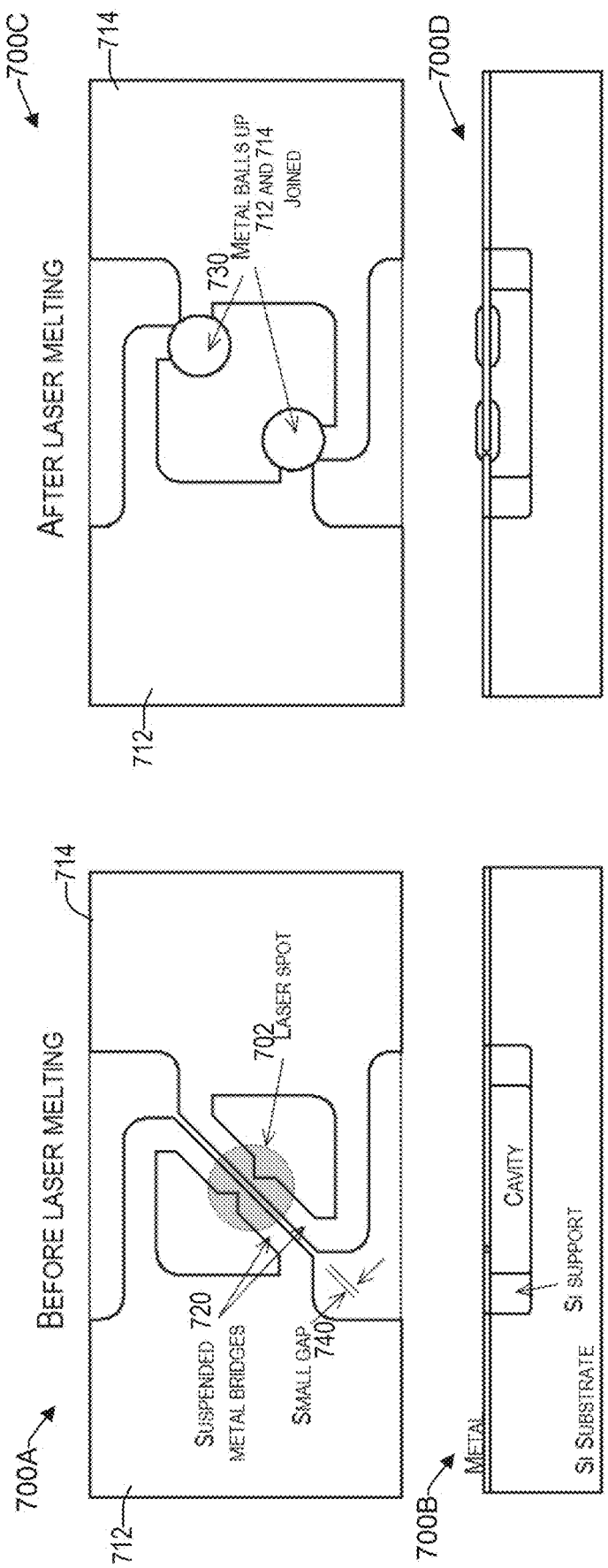
FIG. 7 provides an example anti-fuse structure, before laser melting and after laser melting, respectively, consistent with an illustrative embodiment.

Different geometries are supported for the anti-fuses and fuses discussed herein. In this regard, FIG. 7 provides an example anti-fuse structure, before laser melting 700A and after laser melting 700B, respectively, consistent with an illustrative embodiment. The cantilevered portion 720 of the first and second superconducting traces 712 and 714 are placed in parallel and are separated by a small gap (e.g., 0.1 μm to few μm). Similar to the structure of FIG. 5, the cantilevered portion of the first superconducting trace 712 and the cantilevered portion of the second superconducting trace 712 are configured to receive a laser output (e.g., be exposed to a laser 702) to alter its state (e.g., open to closed). As illustrated in views 700C and 700D of FIG. 7, upon receiving the laser output (e.g., laser melting), the structure melts and creates a plurality of metal balls (e.g., two metal balls 730 in the example of FIG. 7). In one embodiment, the width of the suspended metal bridges is based on the width of the gap 740 to assure that the gap is completely filled after laser melting. For example, there is maximum heat dissipation at the center of the output of the laser beam 702, melting the side arms of the suspended metal wings 516 and forming a plurality of molten balls 730. In one embodiment, the first superconducting trace 712 and the second superconducting trace 714 have a 110 crystal direction with respect to the substrate. While two molten balls 730 are illustrated in FIG. 7 by way of example and to avoid clutter, it will be understood that any number of molten balls is supported by the teachings herein. Accordingly, even if one of the balls does not provide a complete short, one or more other molten balls can provide a sufficient electrical short between the first superconducting trace 712 and the second superconducting trace 714. Stated differently, by way of having a redundant number of shorts, the reliability of the programming (e.g., by laser fusing) is substantially improved.

Figure 8:
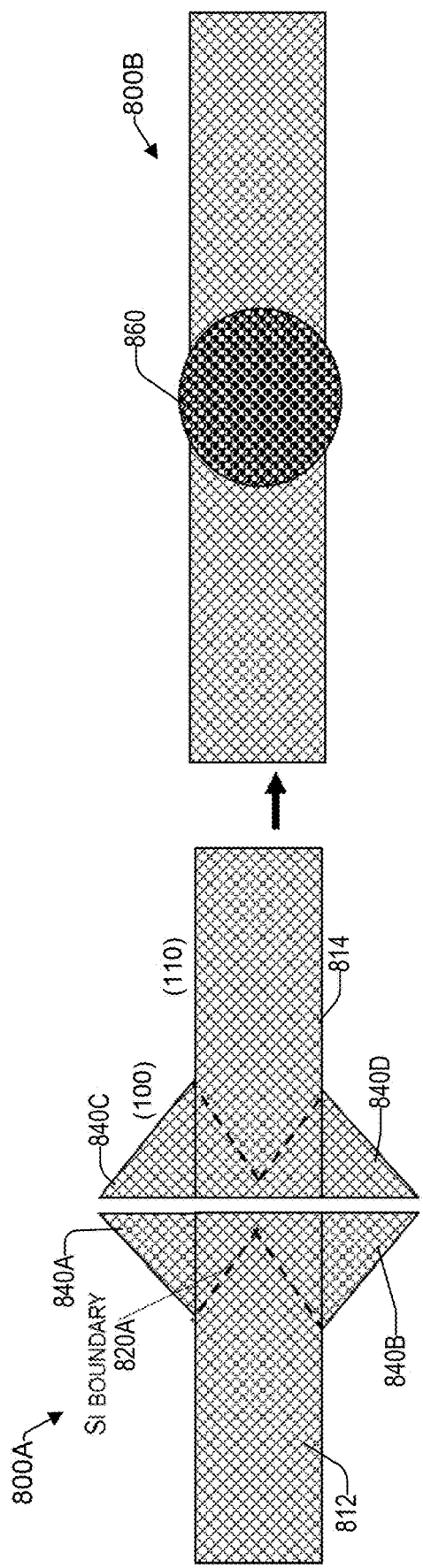
FIG. 8 illustrates a superconducting anti-fuse structure before laser melting and after laser melting, respectively, consistent with an illustrative embodiment.

As mentioned previously, in various embodiments, different shapes of auxiliary suspended material are within the scope of the teachings herein. In this regard, FIG. 8 illustrates a superconducting anti-fuse structure before laser melting 800A and after laser melting 800B, respectively, consistent with an illustrative embodiment. As shown in FIG. 8, the superconducting fuse structure 800A includes a first superconducting trace 812 having a first segment and a second superconducting trace 814 having a second segment. Both the first and second segments are cantilevered over the substrate (not shown). The triangular shaped silicon support 820 below the superconducting trace ca provide structural support for the suspended portion (e.g., to prevent sagging).

There can be a first auxiliary suspended material (e.g., superconducting metal) 840A having a top portion and a bottom portion 840B, coupled to the suspended portion of the first superconducting trace 812 and a second auxiliary suspended material (e.g., superconducting metal) coupled to the suspended portion of the second superconducting trace 814 having a top portion 840C and a bottom portion 840D. In the example embodiment of FIG. 8, the shape of the first and second auxiliary suspended material is triangle shaped. Upon receiving an output of a laser, a molten ball 860 can be formed based on the volume of the material of the auxiliary material 840A to 840D. The auxiliary suspended material may comprise the same material and be created during a same processing step as that of the first and second superconducting traces 812 and 814.

Figure 9:
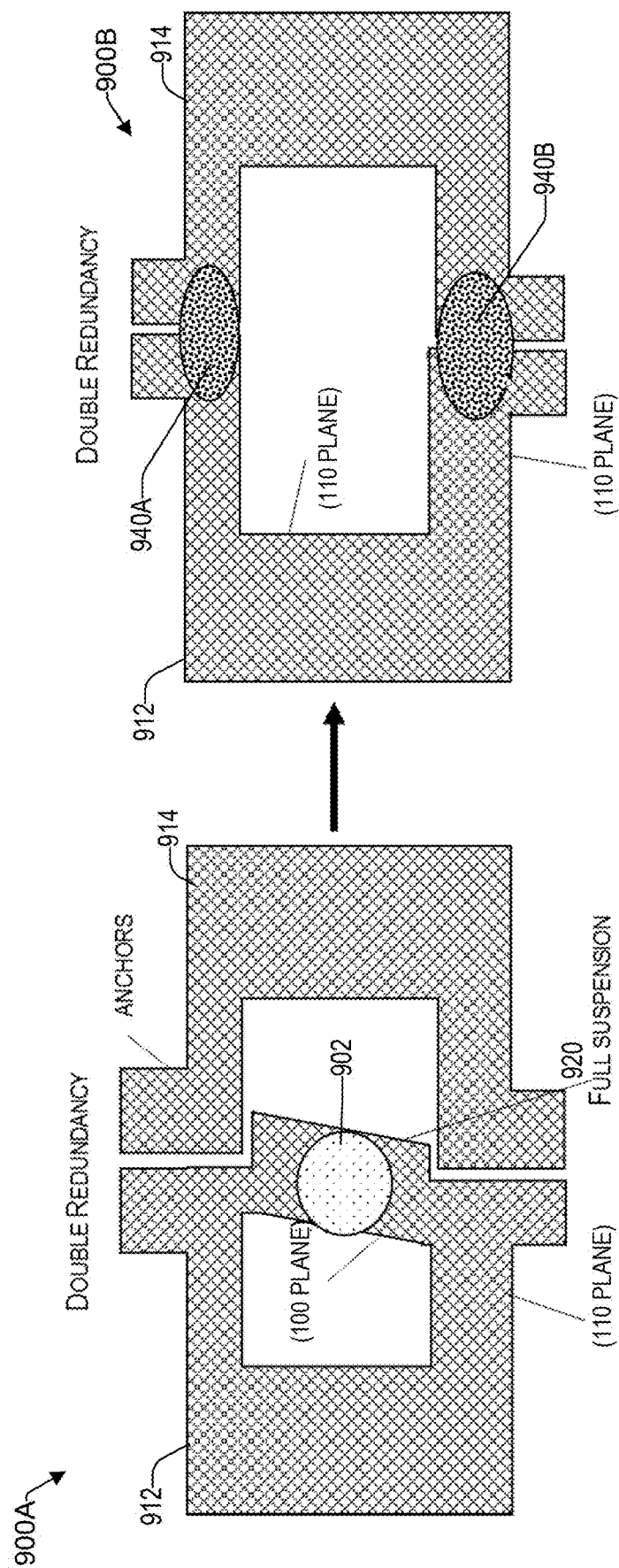
FIG. 9 provides an example superconducting anti-fuse structure without symmetry between a first superconducting trace and a second superconducting trace before fusing and after fusing, respectively.

It will be understood in view of the teachings herein that the superconducting traces and/or the auxiliary suspended material need not be symmetric between the first superconducting trace and the second superconducting trace to be molten together. In this regard, FIG. 9 provides an example superconducting anti-fuse structure without symmetry between a first superconducting trace 912 and a second superconducting trace 914 before fusing 900A and after fusing 900B, respectively. Instead, there is a center air bridge 920 that provides all the auxiliary material for fusing. In one embodiment, the center air bridge 920 has no silicon underneath it, but it is supported in the ends by metal that is partially suspended. Upon receiving an output of a laser 902 on the air bridge 920, a plurality (e.g., two in the example of FIG. 9) of molten balls 940A and 940B are created that create a short (e.g., an electrical path) between the first superconducting trace 912 and the second superconducting trace 914. Again, by way of having a redundant number of shorts (e.g., represented by molten balls 940A and 940B), the reliability of the programming (e.g., by laser fusing) is substantially improved.

Figure 10:
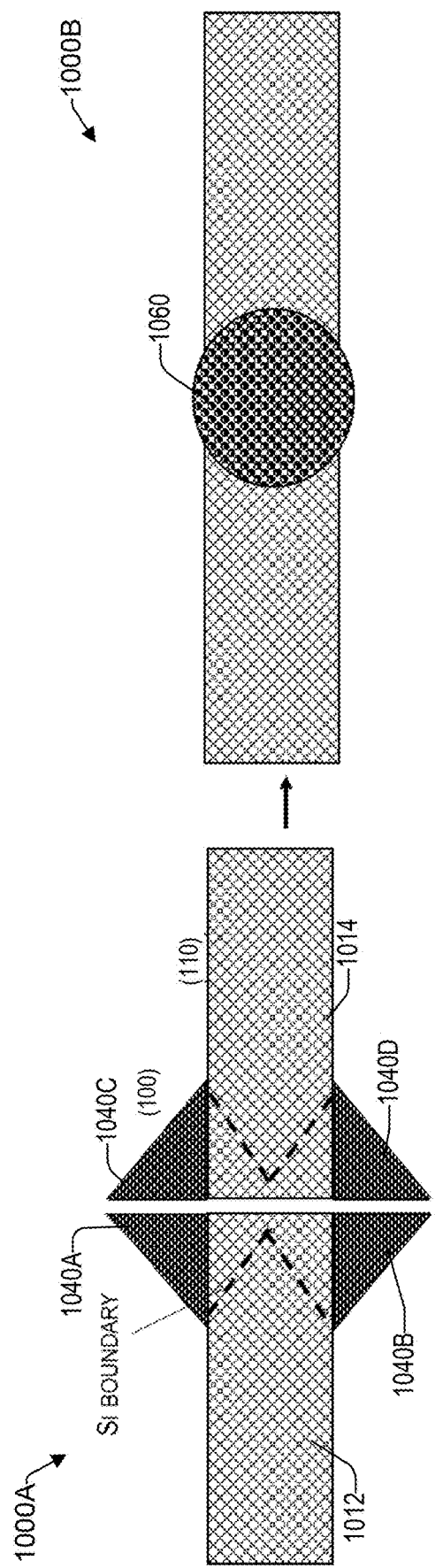
FIG. 10 provides a superconducting anti-fuse structure having a bimorph structure before and after fusing, respectively, consistent with an illustrative embodiment.

FIG. 10 provides a superconducting anti-fuse structure having a bimorph structure before 1000A and after fusing 1000B, respectively, consistent with an illustrative embodiment. Superconducting anti-fuse structure 1000A can include a first auxiliary suspended material (e.g., superconducting metal) 1040A having a top portion and a bottom portion 1040B, coupled to the suspended portion of the first superconducting trace 1012 and a second auxiliary suspended material (e.g., superconducting metal) coupled to the suspended portion of the second superconducting trace 1014 having a top portion 1040C and a bottom portion 1040D that are of different material. Stated differently, the auxiliary material 1040A to 1040D comprises material that has a melting temperature that is different (e.g., lower) than that of the first superconducting trace 1012 and second superconducting trace 1014. In this way, the melting temperature of the combined system is reduced and the molten ball 1060 can be created at a lower temperature.

While the manufacture of a single superconducting switch device or a pair of switch devices is described for the purposes of discussion, it will be understood that other configurations, as well as those having multiple fuses and anti-fuses that disconnect or connect multiple superconducting circuit elements are supported by the teachings herein.

In one aspect, the method and structures as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip may be mounted in a single chip package (such as a plastic carrier, with leads that are affixed to a motherboard or other higher-level carrier) or in a multichip package (such as a ceramic carrier that has either or both surface interconnections or buried interconnections). In any case, the chip can then be integrated with other chips, discrete circuit elements, and/or other signal processing devices as part of either (a) an intermediate product, such as a motherboard, or (b) an end product. The end product can be any product that includes integrated circuit chips, ranging from low-end applications, such as toys, to advanced computer products having a display, a keyboard or other input device, and a central processor.

Example Process

Figure 11:
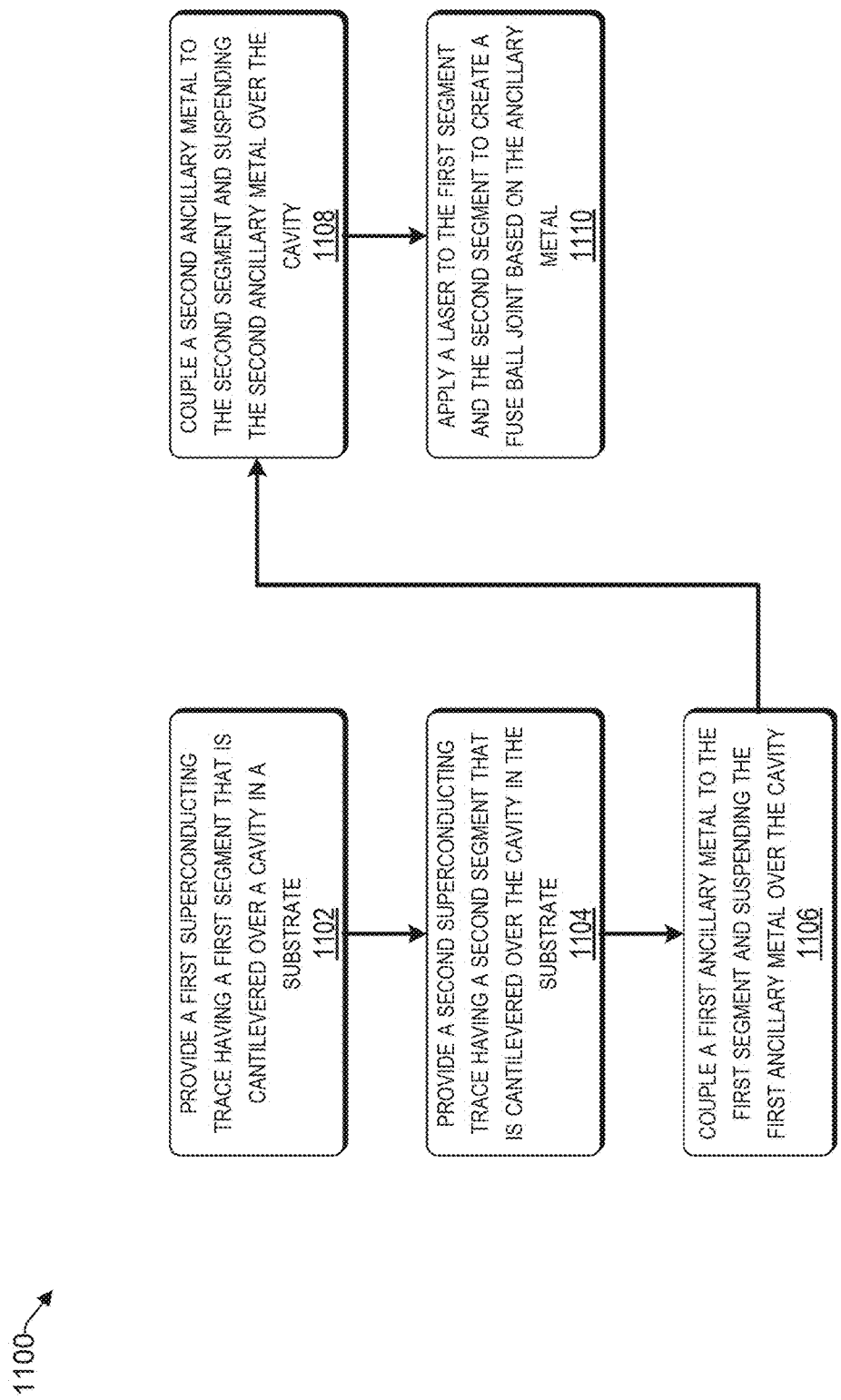
FIG. 11 provides a method of programming a superconducting anti-fuse device, consistent with an illustrative embodiment.
Figure 12:
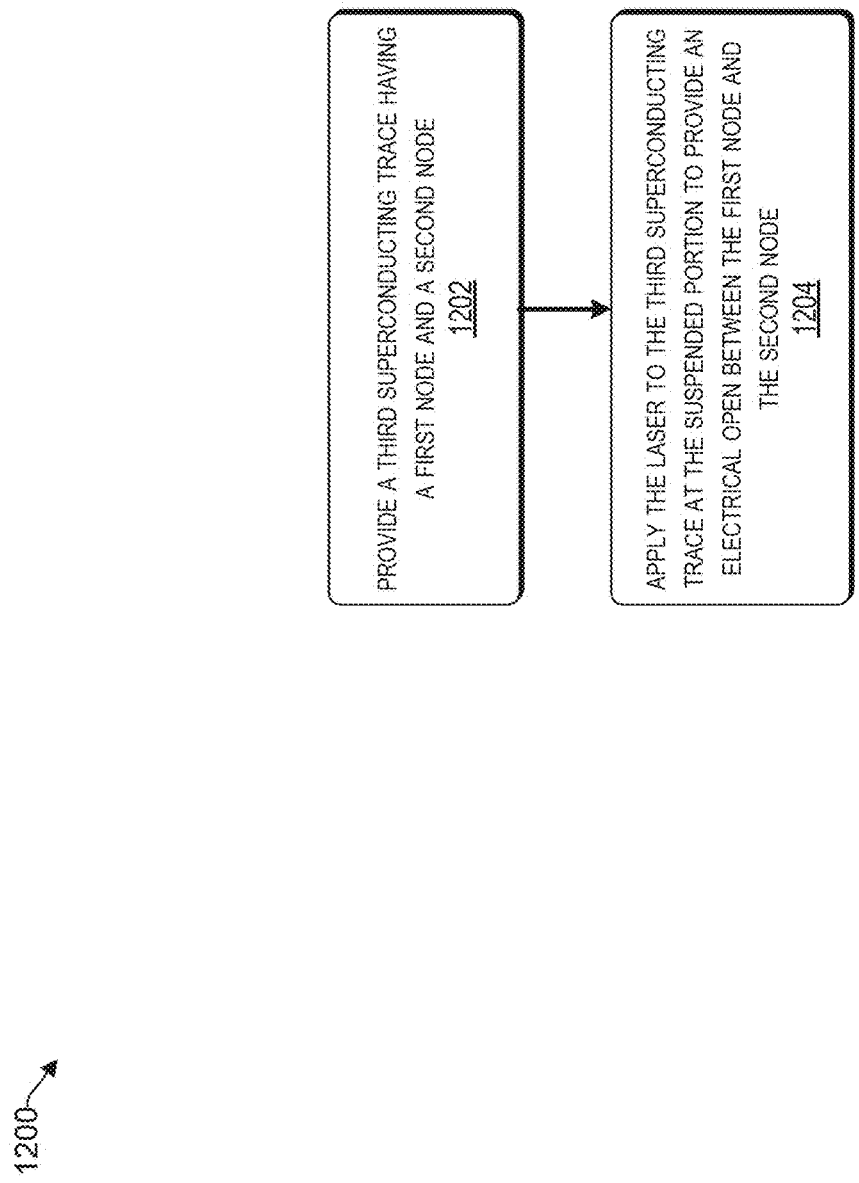
FIG. 12 provides a method of programming a superconducting fuse device, consistent with an illustrative embodiment.

With the foregoing overview of the descriptions of superconducting switch devices, it may be helpful now to consider a high-level discussion of an example process of operation. To that end, FIGS. 11 and 12 present example processes 1100 and 1200 for programming (e.g., connecting and/or disconnecting) superconducting components. More specifically, process 1100 relates to a method of programming a superconducting anti-fuse device and process 1200 relates to a method of programming a superconducting fuse device. Processes 1100 and 1200 are each illustrated as a collection of blocks in a logical flowchart, which represents sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the processes 1100 and 1200 are described with reference to the configurations of FIGS. 3 and 5, respectively. In various embodiments, process 1100 can be performed before process 1200, after process 1200, each independently, or substantially concurrently.

At block 1102, a first superconducting trace having a first segment that is cantilevered over a cavity in a substrate is provided.

At block 1104, a second superconducting trace having a second segment that is cantilevered over the cavity in the substrate is provided.

At block 1106, a first auxiliary segment is coupled to the first segment and suspended the first auxiliary segment over the cavity.

At block 1108, a second auxiliary segment is coupled to the second segment and suspended the second auxiliary segment over the cavity. The first segment and the second segment can face each other and have a predetermined gap therebetween.

At block 1110, a laser is applied to the first segment and the second segment to create a fuse ball joint based on the auxiliary segment, which provides an electrical short between the first superconducting trace and the second superconducting trace.

Referring now to FIG. 1200, at block 1202, a third superconducting trace having a first node and a second node is provided. The third superconducting trace can have a portion suspended over a second cavity in the substrate. The first, second, and third superconducting traces can be of a same material and on a same metal plane.

At block 1204, the laser is applied to the third superconducting trace at the suspended portion to provide an electrical open between the first node and the second node.

Example Computer Platform

Figure 13:
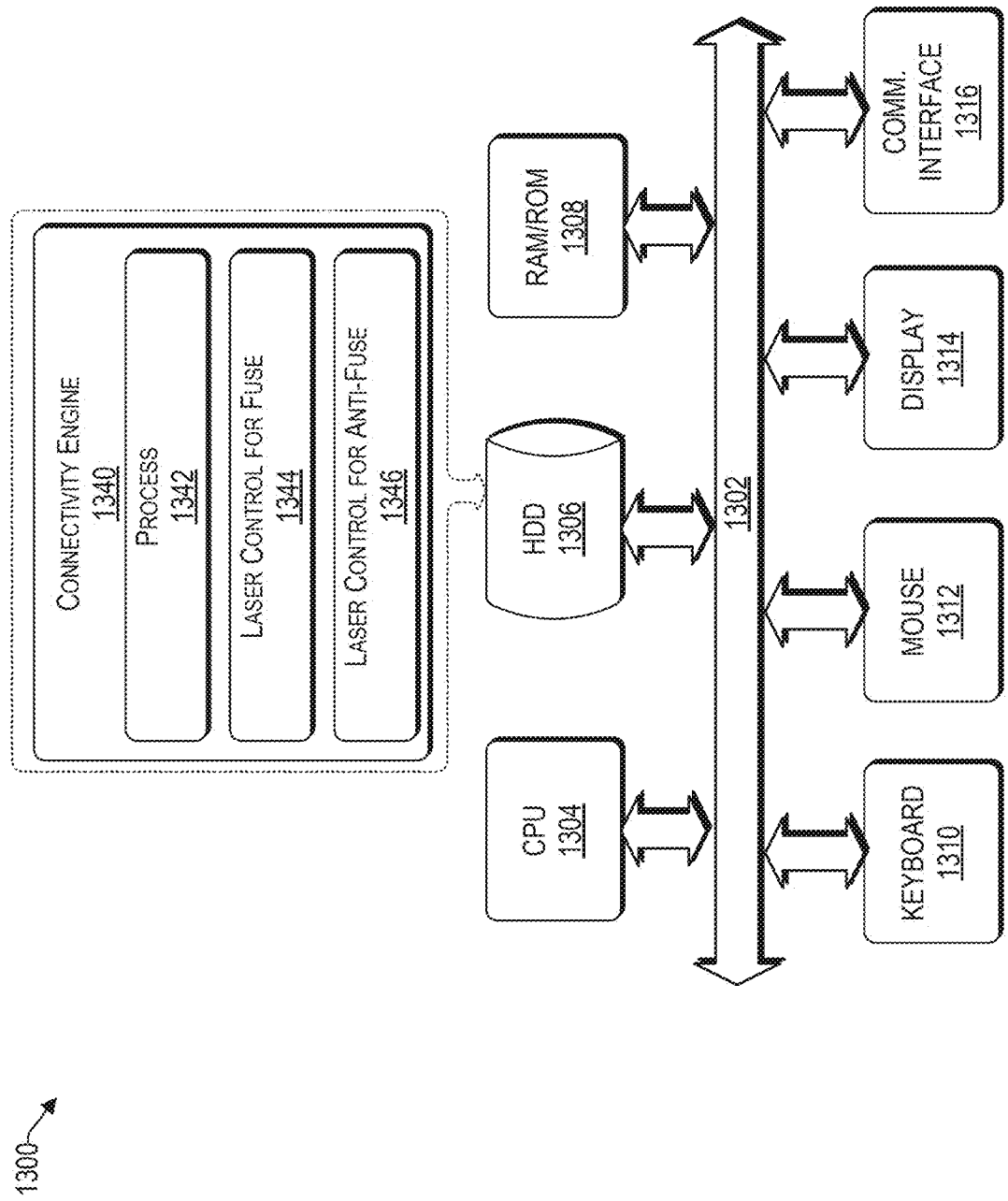
FIG. 13 is a functional block diagram illustration of a particularly configured computer hardware platform that can be used to control various aspects of a suitable computing

As discussed above, functions relating to methods and systems for providing connectivity to superconducting and/or qubit components can be performed with the use of one or more computing devices connected for data communication via wireless or wired communication. FIG. 13 is a functional block diagram illustration of a computer hardware platform that can be used to control various aspects of a suitable computing environment 1300 in which the various embodiments of the features discussed herein can be implemented. While a single computing device is illustrated for simplicity, it will be understood that a combination of additional computing devices, program modules, and/or combination of hardware and software can be used as well. The computer platform 1300 may include a central processing unit (CPU) 1304, a hard disk drive (HDD) 1306, random access memory (RAM) and/or read only memory (ROM) 1308, a keyboard 1310, a mouse 1312, a display 1314, and a communication interface 1316, which are connected to a system bus 1302.

In one embodiment, the HDD 1306, has capabilities that include storing a program that can execute various processes, such as the connectivity engine 1340, in a manner described herein. The connectivity engine 1340 may have various modules configured to perform different functions. For example, there may be a process module configured to control the different manufacturing processes discussed herein and others. There may be a laser control module 1344 operative to provide an appropriate energy output and duration for controlling a state of a fuse. In some embodiments, the same laser control module 1344 can also control anti-fuses. Alternatively, there can be a separate laser control module 1346 operative to provide an appropriate energy output and duration for controlling a state of an anti-fuse.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A superconducting connecting system, comprising:
an anti-fuse structure comprising:
  a substrate;
  a first superconducting trace having a first segment that is cantilevered over a cavity in the substrate;
  a second superconducting trace having a second segment that is cantilevered over the cavity in the substrate;
  a first auxiliary segment coupled to the first segment and suspended over the cavity; and
  a second auxiliary segment coupled to the second segment and suspended over the cavity;
  a first triangular shaped silicon support under the first segment; and
  a second triangular shaped silicon support under the second segment.

2. The superconducting connecting system of claim 1, wherein:
the first segment and the second segment have a predetermined gap therebetween;
the first segment and the second segment are configured to receive an output of a laser; and
an amount of material of the first auxiliary segment and the second auxiliary segment is based on creating a fuse ball joint that provides an electrical short between the first superconducting trace and the second superconducting trace, upon receiving the output of the laser.

3. The superconducting connecting system of claim 1, wherein the first auxiliary segment and the second auxiliary segment are on a same metal plane and of a same superconducting material as the first superconducting trace and the second superconducting trace.

4. The superconducting connecting system of claim 1, wherein the first auxiliary segment and the second auxiliary segment are on a same metal plane as the first superconducting trace and the second superconducting trace.

5. The superconducting connecting system of claim 2, wherein a shape of the first auxiliary segment and the second auxiliary segment is wing shaped.

6. The superconducting connecting system of claim 2, wherein the first auxiliary segment and the second auxiliary segment have a melting temperature that is lower than a melting temperature of the first superconducting trace and the second superconducting trace.

7. The superconducting connecting system of claim 2, wherein the amount of material of the first auxiliary segment and the second auxiliary segment is based on creating at least two fuse ball joints that each provide an electrical short between the first superconducting trace and the second superconducting trace, upon receiving the output of the laser.

8. The superconducting connecting system of claim 2, further comprising a fuse structure comprising a third superconducting trace having a first node and a second node, wherein:
the third superconducting trace has a portion suspended over a second cavity in the substrate;
the first superconducting trace, the second superconducting trace, and the third superconducting trace are of a same material and on a same metal plane; and
the third superconducting trace is configured to receive an output of the laser at the portion to provide an electrical open between the first node and the second node, upon receiving the output of the laser.

9. The superconducting connecting system of claim 8, wherein:
the first superconducting trace and the second superconducting trace are aligned along a first crystal direction of the substrate; and
the third superconducting trace is aligned along a second crystal direction of the substrate that is different from the first crystal direction.

10. The superconducting connecting system of claim 9, wherein:
the first crystal direction has a 110 direction; and
the second crystal direction has a 100 direction.

11. A connecting system, comprising:
a substrate comprising a first cavity and a second cavity;
a fuse structure comprising:
  a first superconducting trace having a first node and a second node and a portion suspended over the first cavity, wherein the first superconducting trace is configured to receive an output of a laser at the portion to provide an electrical open between the first node and the second node, upon receiving the output of the laser;
and
an anti-fuse structure comprising:
  a second superconducting trace having a first segment that is cantilevered over the second cavity;
  a third superconducting trace having a second segment that is cantilevered over the second cavity,
  wherein the first superconducting trace is aligned along a 100 crystal direction of the substrate; and
  wherein the second superconducting trace and the third superconducting trace are aligned along a 110 crystal direction of the substrate.

12. The connecting system of claim 11, wherein the anti-fuse structure further comprises:
  a first auxiliary segment coupled to the first segment and suspended over the second cavity;
  a second auxiliary segment coupled to the second segment and suspended over the second cavity; wherein:
    the first segment and the second segment have a predetermined gap therebetween;
    the first segment and the second segment are configured to receive an output of the laser; and
    an amount of material of the first auxiliary segment and the second auxiliary segment is based on creating a fuse ball joint that provides an electrical short between the second superconducting trace and the third superconducting trace, upon receiving the output of the laser.

13. The connecting system of claim 12, wherein the first auxiliary segment and the second auxiliary segment are on a same metal plane and of a same superconducting material as the second superconducting trace and the third superconducting trace.

14. The connecting system of claim 12, wherein the first auxiliary segment and the second auxiliary segment are on a same plane as the second superconducting trace and the third superconducting trace, but are constructed of different material than at least one of the second superconducting trace and the third superconducting trace to lower a melting temperature in creating the fuse ball joint.

15. The connecting system of claim 11, wherein the first superconducting trace, the second superconducting trace, and the third superconducting trace are on a same metal plane.

16. A superconducting connecting system, comprising:
  an anti-fuse structure comprising:
    a substrate;
    a first superconducting trace having a first segment that is cantilevered over a cavity in the substrate;
    a second superconducting trace having a second segment that is cantilevered over the cavity in the substrate, wherein:
      the first segment and the second segment have a gap therebetween,
      the first segment and the second segment are configured to receive an output of a laser, and
      an amount of material in the first segment and the second segment is based on creating a plurality of fuse ball joints that each provide an electrical short between the first superconducting trace and the second superconducting trace, upon receiving the output of the laser;
    a first triangular shaped silicon support under the first segment; and
    a second triangular shaped silicon support under the second segment.

17. The superconducting connecting system of claim 16, wherein the cavity is a first cavity, and further comprising a fuse structure comprising a third superconducting trace having a first node and a second node, wherein:
  the third superconducting trace has a portion suspended over a second cavity in the substrate;
  the first superconducting trace, the second superconducting trace, and the third superconducting trace are of a same material and on a same metal plane; and
  the third superconducting trace is configured to receive an output of the laser at the portion to provide an electrical open between the first node and the second node, upon receiving the output of the laser.

18. The superconducting connecting system of claim 17, wherein:
  the first superconducting trace and the second superconducting trace are aligned along a first crystal direction of the substrate; and
  the third superconducting trace is aligned along a second crystal direction of the substrate that is different from the first crystal direction.

19. A method of programming superconducting components, comprising:
  providing a first superconducting trace having a first segment that is cantilevered over a cavity in a substrate, comprising a first triangular shaped silicon support under the first segment;
  providing a second superconducting trace having a second segment that is cantilevered over the cavity in the substrate, comprising a second triangular shaped silicon support under the second segment;
  coupling a first auxiliary segment to the first segment and suspending the first auxiliary segment over the cavity;
  coupling a second auxiliary segment to the second segment and suspending the second auxiliary segment over the cavity, wherein the first segment and the second segment face have a predetermined gap therebetween; and
  applying a laser to the first segment and the second segment to create a fuse ball joint based on the first auxiliary segment and the second auxiliary segment, which provides an electrical short between the first superconducting trace and the second superconducting trace.

20. The method of claim 19, wherein the first auxiliary segment and the second auxiliary segment are on a same plane as the first superconducting trace and the second superconducting trace, but are constructed of different material than at least one of the first superconducting trace and the second superconducting trace to lower a melting temperature in creating the fuse ball joint.

21. The method of claim 19, wherein the cavity is a first cavity, and further comprising:
  providing a third superconducting trace having a first node and a second node, wherein:
    the third superconducting trace has a portion suspended over a second cavity in the substrate;
    the first, second, and third superconducting traces are of a same material and on a same metal plane; and
  applying the laser to the third superconducting trace at the portion to provide an electrical open between the first node and the second node.

22. The method of claim 21, wherein:
the first superconducting trace and the second superconducting trace have a first crystal direction; and
the third superconducting trace has a second crystal direction that is different from the first crystal direction.
23. The method of claim 19, wherein:
the substrate comprises silicon (Si); and
the cavity in the substrate is created by an etching of the substrate with at least one of tetramethyl ammonium hydroxide (TMAH), potassium hydroxide (KOH), or tetraethyl ammonium hydroxide (TEAH).
24. The method of claim 22, wherein:
the first crystal direction has a 110 direction; and
the second crystal direction has a 100 direction.

\* \* \* \* \*